United States Patent [19]

Clucas

[11] Patent Number: 5,630,351

[45] Date of Patent: May 20, 1997

[54] WOBBLE YOKE ASSEMBLY

[75] Inventor: Donald M. Clucas, Christchurch, New Zealand

[73] Assignee: Whisper Tech Limited, Christchurch, New Zealand

[21] Appl. No.: 587,444

[22] Filed: Nov. 6, 1995

[30] Foreign Application Priority Data

May 7, 1993 [NZ] New Zealand ............................ 247571

[51] Int. Cl.⁶ .................................................... F01B 3/00
[52] U.S. Cl. ........................ 92/12.2; 92/71; 74/60
[58] Field of Search ...................... 74/60; 92/12.2, 92/71

[56] References Cited

U.S. PATENT DOCUMENTS

| | | |
|---|---|---|
| 4,106,354 | 8/1978 | Girodin . |
| 4,491,057 | 1/1985 | Ziegler . |
| 4,852,418 | 8/1989 | Armstrong . |
| 5,055,004 | 10/1991 | Ebbing et al. .................. 92/12.2 X |
| 5,095,807 | 3/1992 | Wagenseil ........................ 92/12.2 |
| 5,112,197 | 5/1992 | Swain et al. ...................... 74/60 X |
| 5,129,752 | 7/1992 | Ebbing et al. .................... 74/60 X |
| 5,293,810 | 3/1994 | Kimura et al. .................... 92/12.2 |

FOREIGN PATENT DOCUMENTS 2022717  8/1970  France .
91/02889  3/1991  WIPO .

*Primary Examiner*—Hoang Nguyen
*Attorney, Agent, or Firm*—Cushman, Darby & Cushman IP Group of Pillsbury Madison & Sutro LLP

[57] ABSTRACT

A wobble yoke mechanism for converting reciprocating motion to rotary motion (or vice versa) in which each of two yokes (4) are connected to beams (3) by bearings (10, 10', 15, 15') having only one degree of freedom. The two yokes are 90° out of phase. An eccentric bearing (15), also having only one degree of freedom, is fitted to or about the nutating shaft (16) and is connected to one end of each of the yokes (3). All the axes of the pairs of bearings pass through a central pivot point (5). The axes of the pistons need not be straight nor need they be parallel with the axis of the crankshaft (12).

9 Claims, 5 Drawing Sheets

WOBBLE YOKE ASSEMBLY

This is a Continuation of International Appln. No. PCT/NZ94/00038 filed May 5, 1994.

BACKGROUND OF THE INVENTION

The present invention relates to a wobble yoke mechanism for use in a reciprocating piston machine or other positioning device. Such a machine may be for example, a pump, a refrigerator, a compressor, an internal combustion engine or other engine e.g. a Stirling engine. Such a machine may also include a positioning ram(s) for devices requiring precise positioning, e.g. a satellite dish. The axes of the piston(s) need not be parallel with a drive shaft (if present).

An object of the invention is the provision of a compact mechanism to convert reciprocating motion to rotary motion (or vice versa). The pistons drive through a wobble yoke mechanism which eliminates the need for slides, gears and multi-degree of freedom joints.

DESCRIPTION OF PRIOR ART

Engine mechanisms using a single wobble plate are known. The designs have had major difficulties. For example it was common to inadequately constrain or to overconstrain the wobble plate. However, the major problems of a wobble plate design are that the loci of the connecting rod bearings follow an arc in one plane and a figure of eight in a second plane. Thus, the joints on either end of the connecting rod (one to the wobble plate and one to the piston) require spherical or universal joints or bearings or multi-degree of freedom joints/bearings. U.S. Pat Nos. 4,852,418 (Armstrong) and 4,106,354 (Girodin) are examples of such; as are U.S. Pat. No. 4,491,057 (Ziegler) and WO 91/2889 (Meylaers). A further problem that results from the use of such a plate is the question of transferring the torque reaction of the wobble plate to the engine casing. This can be achieved with a torque arm or a bevel gear. However, the solutions are not ideal.

An alternative to a wobble plate is a swash plate. However, such plates do have design disadvantages: lubrication is an essential requirement; problems are noted at low speeds when the torque is high as a result of the hydrodynamic lubrication not being fully developed; the problem of preventing lubricants entering the working space from the mechanism housing (in, for example, the case of a Stirling engine); the high side load on the piston rods due to the reaction force against the swash plate; and the requirement of purpose-manufactured high precision components.

An alternative mechanism is a slider crank used by most internal combustion engines and compressors. However the disadvantages that arise with this crank are that there are high piston side loads due to the connecting rod angle. Such problems can be overcome with the use of cross heads but this requires additional lubrication and extra engine length. There is usually a resultant additional frictional loss and added rod sealing complexity. Also, with a slider crank mechanism it is very difficult or impossible to achieve a variation in swept volume while the engine is running.

In the special case of a Stirling engine with a slider crank, the mechanism housing is generally not stilted to pressurisation for engines of more than a few kilowatts. Where this is not the case, complex piston rod seals are required.

It is therefore an object of the present invention to provide an improved machine for converting reciprocating motion to rotary motion (or vice versa) which avoids or minimises the problems and drawbacks outlined above.

It is a further object of tile present invention to provide such a machine in which the improvements do not require that the pistons be parallel with a drive shaft of the machine or mechanism.

A still further object of the invention is to provide an improved machine as outlined above that can achieve close to, or complete, dynamic balance.

For the purposes of the rest of tile specification, the term "converting reciprocating motion to rotary motion" shall be deemed to include the opposite conversion—rotary motion to reciprocating motion. Also, in this specification the term "piston" is defined to include, but not to be limited to: a piston of known type in a single- or double-acting engine; a displacer; and a reciprocating ram such as can be used as a positioning mechanism.

SUMMARY OF THE INVENTION

The present invention provides a wobble yoke mechanism for converting reciprocating motion to rotary motion, said mechanism providing a plurality of pistons (as defined above) having piston heads operatively connected to the wobble yoke mechanism and a crankshaft;

said wobble yoke mechanism including:
- a central pivot point through which the torque reaction passes;
- a first beam pivoting about said point in one plane to which is attached at at least one end at least one piston via bearings with one degree of freedom;
- at least a first yoke connected to at least one end of said first beam via at least one bearing the axis of which passes through the central pivot point, each said bearing having one degree of freedom;
- a second beam pivoting about said point in one plane to which is attached at each end at least one piston via bearings with one degree of freedom
- a second yoke at 90° out of phase to the first yoke, said second yoke being connected to at least one end of said second beam via at least one bearing the axis of which passes through the central pivot point, each said bearing having one degree of freedom; and
- an eccentric bearing fitted to or about the crankshaft and connected to one end of each of the first and second yokes;

wherein:
- no bearing has more than one degree of freedom;
- the axes of all bearings pass through the said central pivot point; and
- there is a degree of rotary freedom between the two yokes about the axis of the eccentric bearing.

Preferably there is a second eccentric bearing which can be, but need not be, fitted to or about the crankshaft, provided that its placement still provides a degree of rotary freedom between the two yokes.

In a first preferred embodiment of the invention, the pistons are parallel with a drive shaft, with connecting rods of known type which are positioned between the bearings and the pistons. Alternatively the axes of the pistons may be splayed at an angle relative to the drive shaft.

In a second preferred embodiment of the invention, each yoke continues in a smooth uniform rigid component to connect with the pistons each of which are toroidal inside a hollow toroidal cylinder.

In a third preferred embodiment of the invention, the angle of eccentricity of the eccentric bearing(s) can be varied. In this embodiment the pistons may be any of the above described configurations of pistons in the first and second embodiments.

BRIEF DESCRIPTION OF THE INVENTION

By way of example only, preferred embodiments of the present invention are described in detail with reference to a four cylinder double acting configuration engine and with reference to the accompanying drawings, in which.

DETAILED DESCRIPTION

First Preferred Embodiment.

Figure 1:
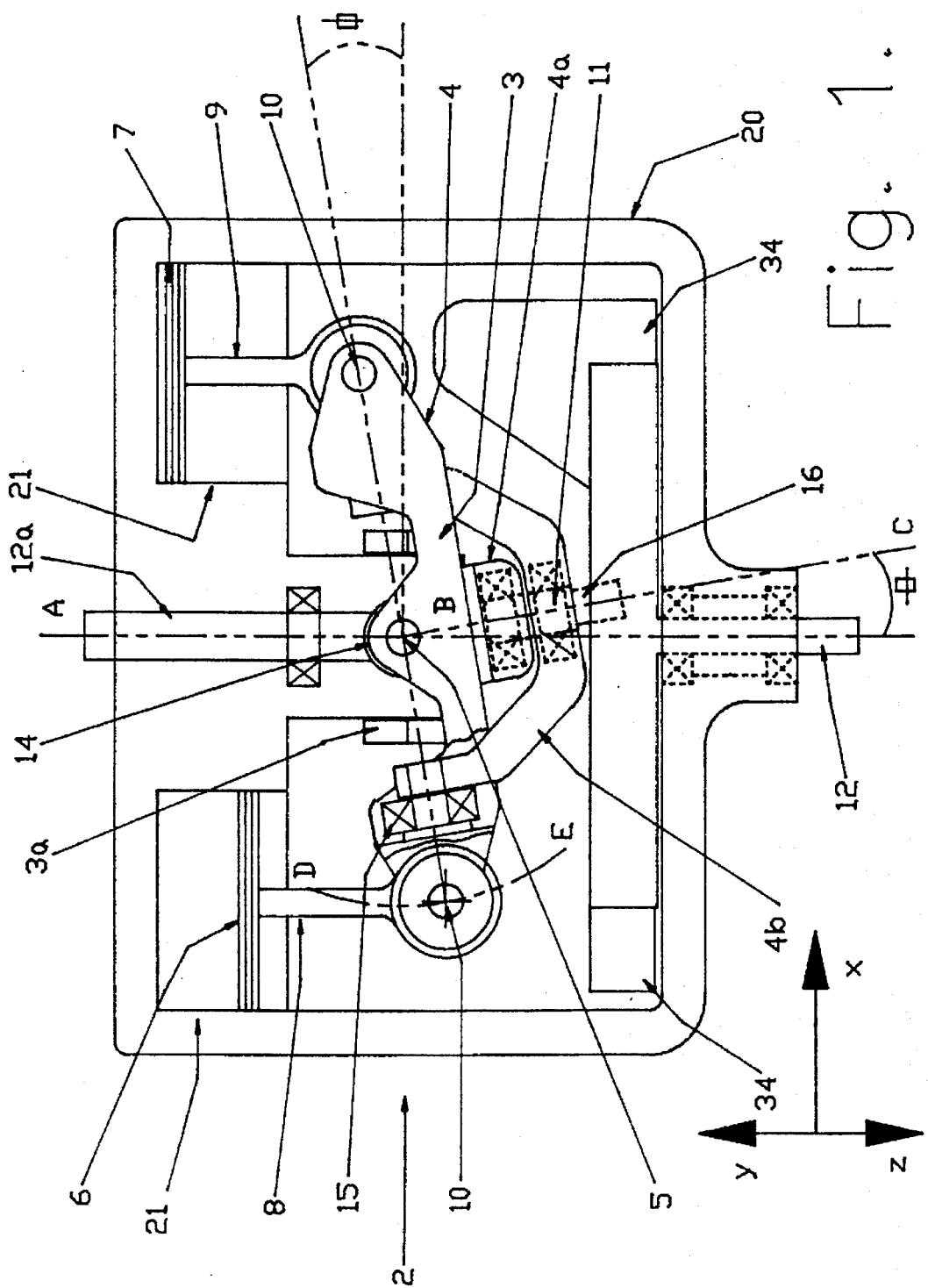
FIG. 1 is a section view through an engine incorporating a first preferred embodiment of the present invention.
Figure 2:
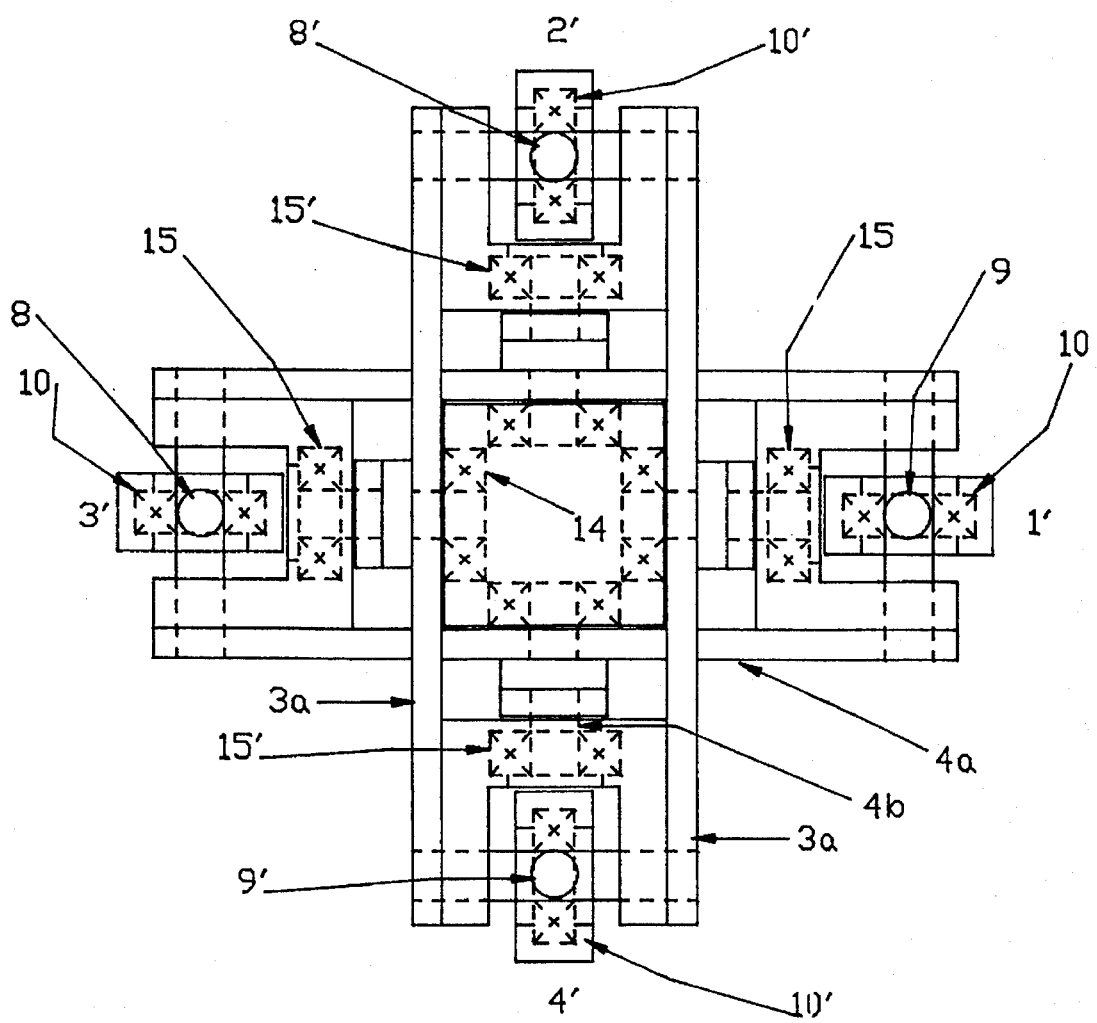
FIG. 2 is a section plan view of part of an engine incorporating the first preferred embodiment of the present invention.
Figure 5:
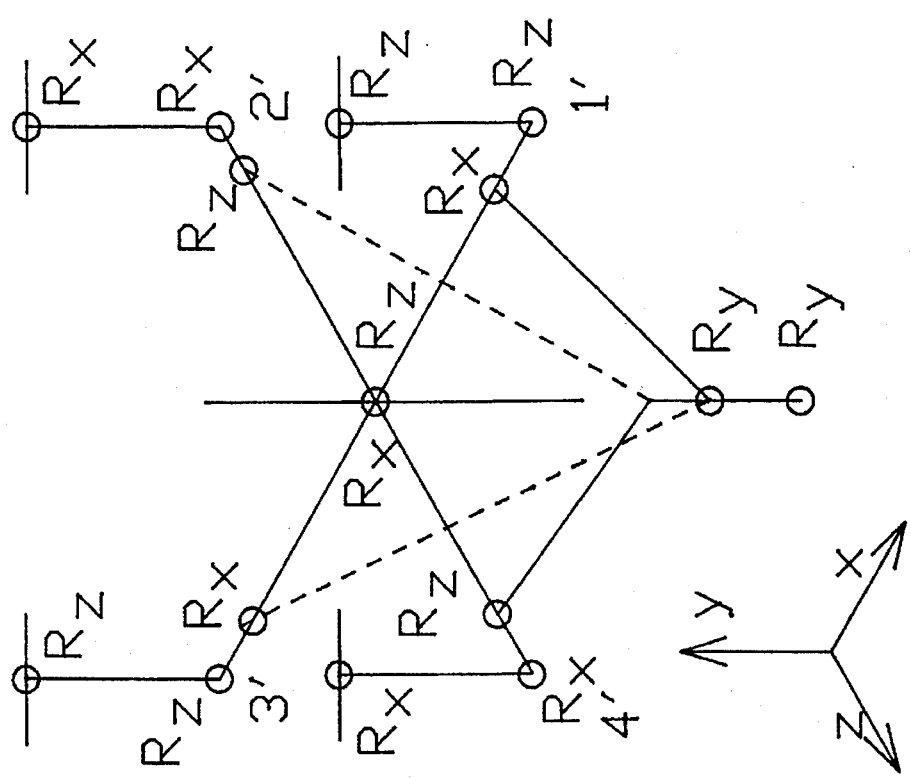
FIG. 5 is a diagram showing the direction and position of the degrees of freedom for the third preferred embodiment of the present invention.

Referring to FIGS. 1, 2 and 5: the engine 2 is shown with piston positions 1',2', 3' and 4' as shown in an anti-clockwise direction on FIG. 2.

The engine 2 includes an engine housing assembly 20 incorporating four identical cylinder assemblies 21, an output crankshaft 12, and a wobble yoke assembly 4. The four pistons are referenced by the numerals 6, 7, and 6' and 7' (not shown) with connecting rods 8, 9 and 8' and 9' (see FIG. 2), respectively.

Each of the cylinder assemblies 21 is of a generally well known type, the axes of which are parallel to one another and to the main, central axis A (FIG. 1). If so desired, the axes need not be parallel or need not be parallel to axis A (FIG. 1).

The engine 2 includes a beam 3 of a first yoke 4a which pivots about its centre point 5. The beam 3 is attached to two pistons 6, 7 (via respective piston connecting rods 8, 9 at one end of the said connecting rods 8, 9) through a pair of bearings 10. The beam 3 has one degree of freedom ($R_z$, see FIG. 5) as have the pair of bearings 10. A second yoke 4b is connected to a second beam 3a through a pair of bearings 15' at right angles to the bearings 10'. The centre of the second yoke 4b passes through axis BC. The bearings 15, 15' thus have only one degree of freedom.

Two eccentric bearings 11 are fitted around a nutating shaft 16 and are rigidly attached to both wobble yokes 4a, 4b, respectively. The bearings 11 are positioned along the secondary axis BC (FIG. 1) which is at an angle $\Theta$ to the central axis A. The secondary axis BC and nutating shaft 16 rotate about the central axis A. The secondary axis BC intersects the central axis A at the centre point 5. The nutating shaft 16 is connected to the drive shaft 12a in known manner.

The second wobble yoke 4b is positioned at a right angle to the first wobble yoke 4a. The first wobble yoke 4a controls the motion of pistons 6, 7. The second wobble yoke 4b controls the motion of pistons 6' and 7' (positioned at 2',4' on FIG. 2). As described above for the first yoke 4a, the second yoke 4b is connected to the respective connecting rods 8', 9' through a pair of bearings 10' with one degree of freedom (see FIG. 5).

As the pistons 6, 7 reciprocate, the beam 3 and yoke assembly 4 pivot about the centre point 5. The maximum angle between the beam 3 and the horizontal plane, the maximum beam angle, is depicted by $\phi$. Providing that the maximum beam angle $\phi$ is small (that is, less than 15°) the rotation of the crankshaft 12 will result in near-sinusoidal motion of each of the pistons (6, 7, 6', 7') when the pistons (6, 6', 7, 7') are parallel or near-parallel to the central axis A of the engine 2. This also occurs with the second and third preferred embodiments (as described below). The arrangement of the pairs of bearings 10, 10', 15 and bearings 11 is such that the axes of all bearings intersect at the intersection of the central axis A with the centre point 5. This centre point 5 is also the centre of a beam bearing 14.

Thus, the connecting rods 8, 9 moving on one plane at a 180° phasing can have lower connecting rod bearings 10 with one degree of freedom $R_z$. The connecting rods (8', 9') for the alternate pair of pistons (6', 7') are at a 90° phase to the beam 3 and move in an arc on the yz plane (but not on the xy plane).

Thus, joints or bearings 10, 10' requiring only one degree of freedom ($R_x$, $R_z$) are required at both ends of the connecting rods (8, 8', 9, 9'). Any of the joints or bearings (10, 10') could be flexure joints of known type.

Between the two wobble yokes 4a, 4b there is some degree of rotational freedom about the axis BC. The connection of the connecting rods (8, 8', 9, 9') to the respective pistons (6, 6', 7, 7') can be rigid. If so desired, the connection can be through a bearing (not shown) with one degree of freedom.

With such a configuration of the yoke assembly 4 for an engine 2 the torque reaction is taken through the beam bearing 14. As all pairs of bearings have only one degree of freedom such bearings can be deep groove ball races or similar and pre-lubricated sealed bearings can be used.

With the addition of suitable, known additional balance weights 34 the engine 2, when running, has been found to be very close to dynamically balanced. The drive shaft 12a can be used to drive ancillary devices (not shown), for example valves, pumps or such mechanisms as are necessary for the running of the engine 2.

The motion of the bearings 10, 10' at the bottom end of the connecting rods gives all four bearings 10, 10' a motion which follows an arc DE (shown as FIG. 1). As can be seen from this arc, there is very small horizontal displacement of the bearings 10, 10'. As a result of this very small horizontal displacement, there is a very low piston side load, thus increasing the efficiency and longevity of the engine 2. It also simplifies the design of the connecting rod seals and bearings.

The pair of bearings 15 are shown in FIG. 1 as being positioned closer to the central axis A than the bearings 10 connecting the beam 4 to the connecting rods 8, 10. If so desired these bearings 10 can be positioned further out from the central axis A relative of the bearings 10.

Figure 3:
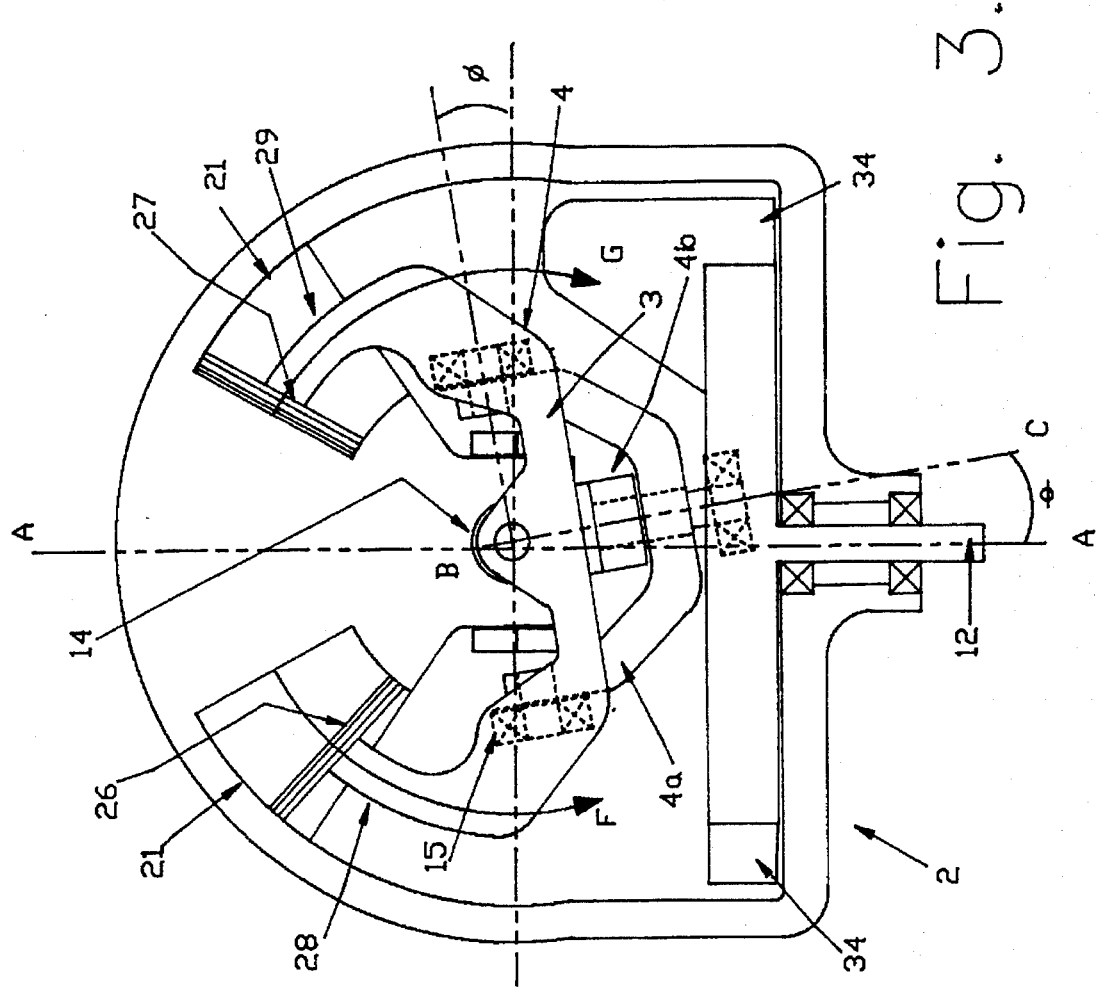
FIG. 3 is a section view of an engine incorporating a second preferred embodiment of the present invention.

Second Preferred Embodiment. Referring to FIG. 3 like parts to the first preferred embodiment are numbered accordingly and the configuration of the pistons is the same as for the first preferred embodiment. In this preferred embodiment the beam 3 of the first wobble yoke 4 is integrally and rigidly connected to the connecting rods 29. The pistons 26 and 27 can be toroidal in shape. Alternatively, the pistons may be only a disc sufficient to support a seal. The pistons 26, 27 follow an arcuate reciprocating motion rather than an axial reciprocating motion. The formation of the integral connecting rods 29 and beam 3 leads to a total lack of side ways force on the pistons 26, 27 relative to the curved axis FG. This eliminates all piston friction loss and lubricating requirements, and leaves only seal friction loss as a factor reducing engine efficiency with respect to the pistons.

Third Preferred Embodiment.

Figure 4:
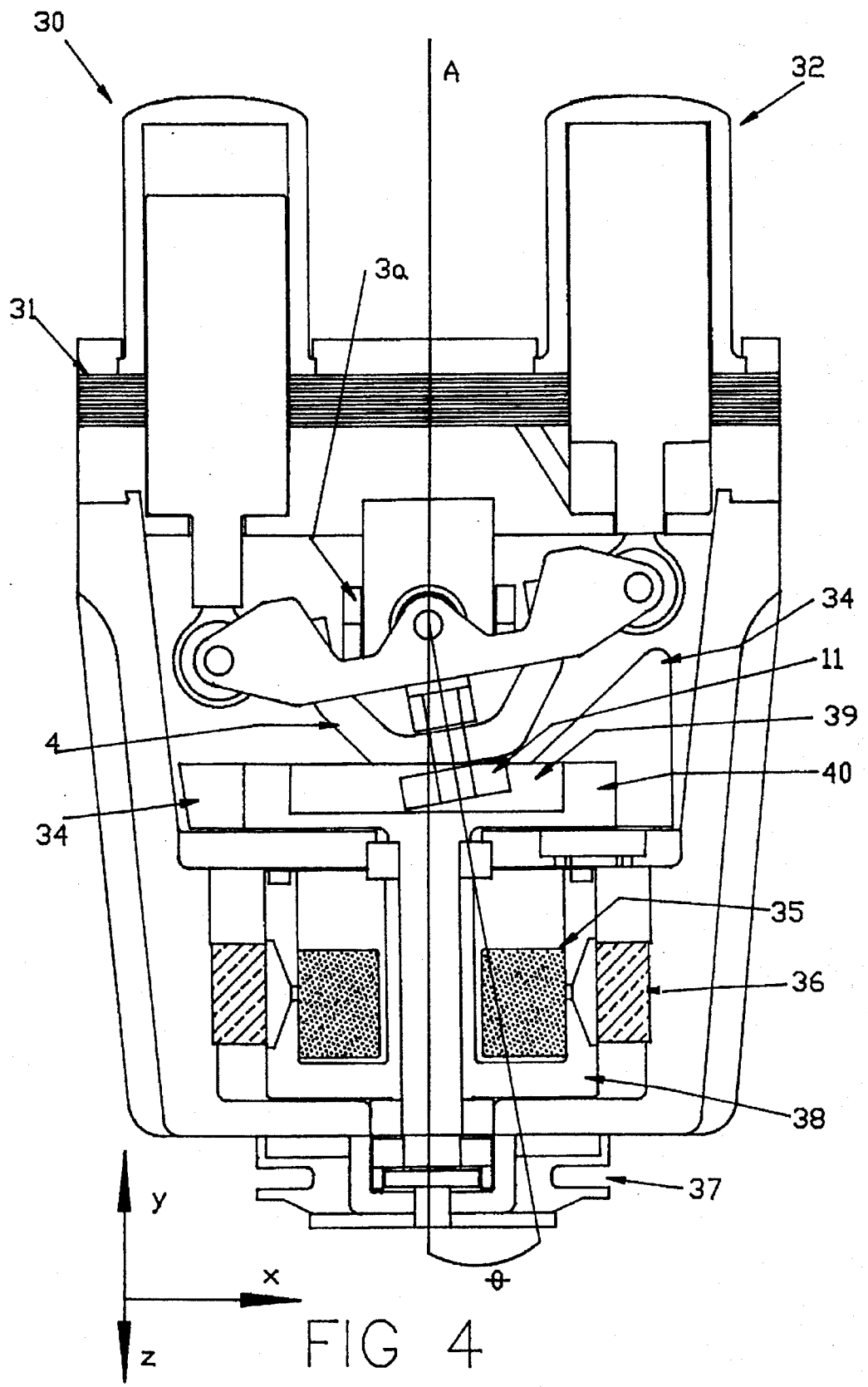
FIG. 4 is a section of a stirling engine embodying the third preferred embodiment of the present invention.

Referring to FIG. 4 and the Stirling engine 30 shown therein: the wobble yoke mechanism 4 of the first preferred embodiment of the invention is incorporated therein but with one major alteration. Like components to the first preferred embodiment are numbered accordingly and the configuration of the pistons is the same as for the first preferred embodiment. The major difference is that in this embodiment the angle (θ) can be varied by varying the position of the eccentric bearing 11 relative to the major axis A. The variable position of the bearing 11 is achieved by known means, such as mechanically, electrically or hydraulically operated actuators. The bearing is positioned within a space 39 in the balance weight 34 on the crank shaft 12. The nutating shaft 16 is rigidly fixed to one yoke (4a or 4b) and has one degree of freedom about the axis BC with respect to the second yoke (4b or 4a). The nutating shaft 16 has one degree of freedom with respect to the eccentric bearing 11.

The engine 30 includes known Stirling engine components: a flat cold plate 31; a finned hot end 32; and a balance weight 34. If the Stirling engine 30 is to be used as a 12 v battery charger, as shown in the embodiment of FIG. 4, other elements of the engine 30 will include a stationary field coil 35, a stator 36, a recoil manual starter 37 and a rotor 38. These latter elements, being standard parts for a battery charger, operate in known fashion. Using the engine 30 of the third preferred embodiment in a Stirling engine with pistons having a variable stroke, tests have shown that an air-charged Stirling engine with a speed of 1500 rpm on a 20 mm stroke with a 40 mm bore and 10 bar mean cycle pressure can produce an output of more than 400 W.

Whilst the invention has been described with reference to a Stirling engine, this is not the only mechanism or engine in which the yoke assembly 4 can be used. It can be used in gas compressors refrigeration compressors and hydraulic motors/pumps. Compact dry air compressors where lubricant cannot be allowed to enter the air supply is an appropriate mechanism in which to use the invention. The low piston side loads and engine balance mean that the yoke assembly 4 can be effectively used in compact internal combustion engines or steam engines.

By varying the distance between the centre of the connecting rod bearing and the respective piston connecting rod bearing centre (or the centre of the top of the respective connecting rod, if there is no appropriate bearing), the position of the centre of the eccentric bearing 11 (in the third preferred embodiment) or the position of one of the two eccentric bearings 11 (in the second and first preferred embodiments) can be controlled by two linear actuators of known type. That is the angle between axis BC and axis A can be varied and controlled.

Such an arrangement of the yoke assembly is well suited to use in mechanisms for precisely position other devices. Such other devices can be satellite dishes, mirrors or solar collecting dishes (etc).

I claim:

1. A wobble yoke mechanism for converting reciprocating motion to rotary motion, said mechanism providing a plurality of pistons having piston heads operatively connected to the wobble yoke mechanism and a crankshaft;
said wobble yoke mechanism comprising:
 a central pivot point through which the torque reaction passes;
 a first beam having two ends and which pivots about said point in one plane, at least one piston being attached to at least one said via bearings with one degree of freedom;
 at least a first yoke connected to at least one end of said first beam via at least one beating the axis of which passes through the central pivot point, each said bearing having one degree of freedom;
 a second beam having two ends and which pivot about said point in one plane, at least one piston being attached to at least one said end via bearings with one degree of freedom;
 a second yoke at 90° out of phase to the first yoke, said second yoke being connected to at least one end of said second beam via at least one bearing the axis of which passes through the central pivot point, each said bearing having one degree of freedom; and
 an eccentric bearing fitted to or about the crankshaft and connected to one end of each of the first and second yokes;
wherein
 no bearing has more than one degree of freedom;
 the axes of all bearings pass through said central pivot point; and
 there is a degree of rotary freedom between the two yokes about the axis of the eccentric bearing.

2. A wobble yoke mechanism as claimed in claim 1 wherein said mechanism further comprises a second eccentric bearing which is fitted to or about the crankshaft.

3. A wobble yoke mechanism as claimed in claim 1 wherein the mechanism further comprises a drive shaft and wherein the axes of the pistons are parallel to the axis of the driveshaft.

4. A wobble yoke mechanism for converting reciprocating motion to rotary motion, said mechanism providing a plurality of pistons having piston heads operatively connected to the wobble yoke mechanism and a crankshaft;
said wobble yoke mechanism comprising:
 a central pivot point through which the torque reaction passes;
 a first beam having two ends and which pivots about said point in one plane, at least one piston being attached to at least one said end via bearings with one degree of freedom;
 at least a first yoke connected to at least one end of said first beam;
 a second beam having two ends and which pivots about said point in one plane, at least one piston being attached to at least one said end via bearings with one degree of freedom;
 a second yoke at 90° out of phase to the first yoke, said second yoke being rigidly connected to at least one end of said second beam;
 an eccentric bearing fitted to or about the crankshaft and connected to one end of each of the first and second yokes;
wherein:
 no bearing has more than one degree of freedom;
 the axes of all bearings pass through the said central pivot point;
 the pistons follow an arcuate reciprocating motion; and
 there is a degree of rotary freedom between the two yokes about the axis of the eccentric bearing.

5. A wobble yoke as claimed in claim 1 wherein each eccentric bearing is at an angle of eccentricity to the crankshaft, which angle can be varied.

6. A wobble yoke mechanism as claimed in claim 4 wherein each eccentric bearing is at an angle of eccentricity to the crankshaft, which can be varied.

7. A reciprocating piston machine wherein the conversion of reciprocating motion to rotary motion is provided by a wobble yoke mechanism as claimed in claim 1.

8. A reciprocating piston machine wherein the conversion of reciprocating motion to rotary motion is provided by a wobble yoke mechanism as claimed in claim 4.

9. A reciprocating piston machine wherein the conversion of reciprocating motion to rotary motion is provided by a wobble yoke mechanism as claimed in claim 5.

* * * * *